No. 828,304. PATENTED AUG. 14, 1906.
F. B. CUMPSTON.
WIND STACKER ON GRAIN SEPARATORS.
APPLICATION FILED JULY 10, 1905.
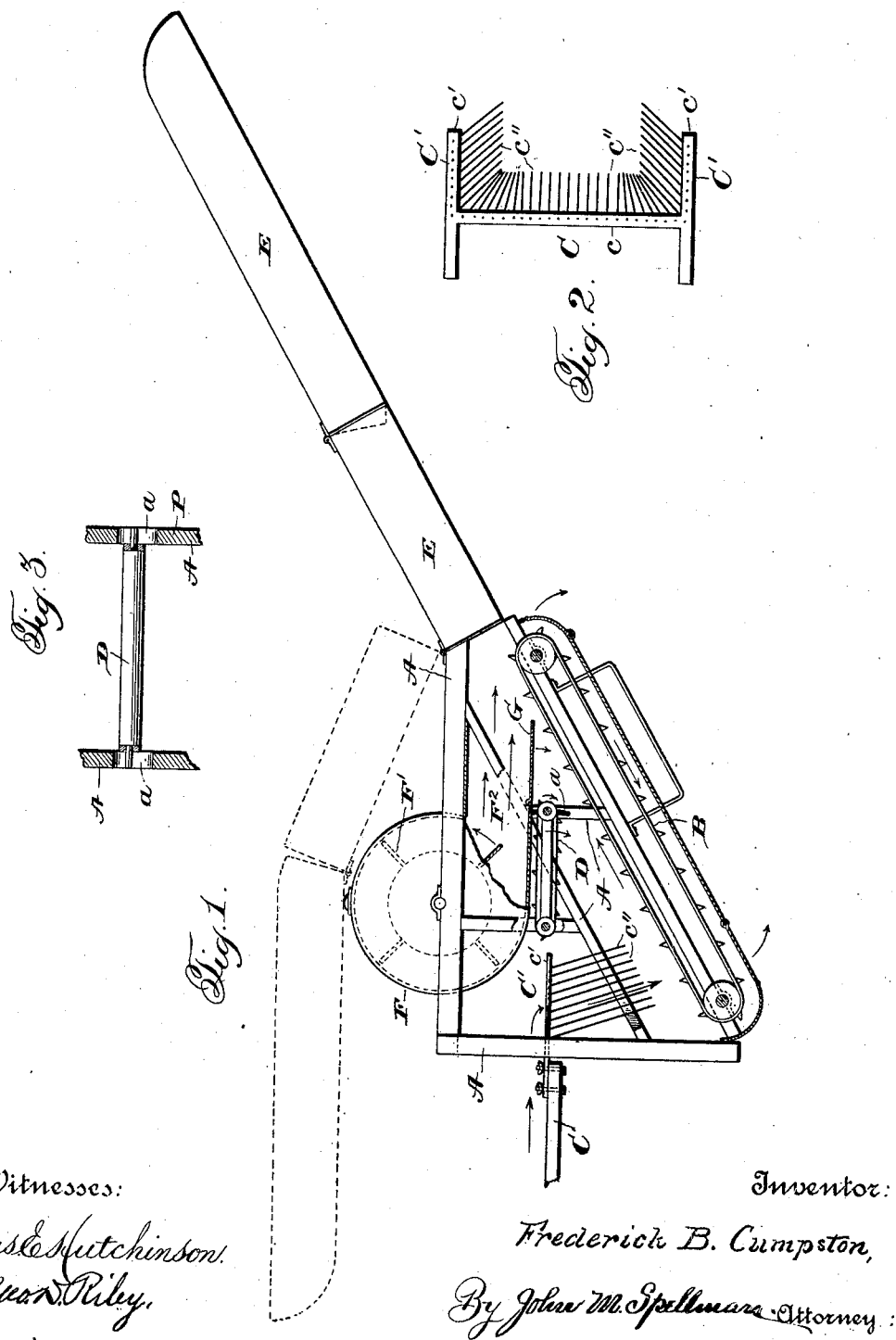
Witnesses:
Jas E Hutchinson
Geo. Riley
Inventor:
Frederick B. Cumpston,
By John M. Spellman, Attorney
THE NORRIS PETERS CO., WASHINGTON, D. C.

UNITED STATES PATENT OFFICE.

FREDERICK BERNARD CUMPSTON, OF BLOOMING GROVE, TEXAS.

WIND-STACKER ON GRAIN-SEPARATORS.

No. 828,304.  Specification of Letters Patent.  Patented Aug. 14, 1906.

Application filed July 10, 1905. Serial No. 269,125.

*To all whom it may concern:*

Be it known that I, FREDERICK BERNARD CUMPSTON, a citizen of the United States, residing at Blooming Grove, in the county of Navarra and State of Texas, have invented a new and useful Improvement in Wind-Stackers and Grain-Separators, of which the following is a specification.

This invention relates to an improvement in pneumatic stacker for threshing-machines; and the object of the invention is the provision of a stacker of this type in which the grain is delivered from the threshing-machine onto an endless carrier and is then driven by a blast of air through the discharge-spout of the stacker, the fan for causing the blast of air being so positioned as to preclude the possibility of any of the straw or chaff gaining access thereto.

A further object of the invention is the provision of means for preventing the accumulation or choking of the straw upon the carrier of the stacker.

A further object of the invention is the provision of means for preventing any of the straw or hay from being blown rearwardly into the thresher by any backward drafts.

Other objects of the invention will be apparent from the description hereinafter, when read in connection with the accompanying drawings, wherein a preferable embodiment of my invention is shown and wherein like letters of reference refer to similar parts.

In the drawings, Figure 1 is a side elevation, partly in section, of my improved stacker. Fig. 2 is a detail view of a chute which is adapted to be secured to the end of the shaking member of the threshing-machine to direct the straw and chaff therefrom onto the carrier of the stacker; and Fig. 3 is a detail view, partly in section, showing the manner of supporting the forward end of the top conveyer, which is adapted to be movably supported upon the other.

Referring now more particularly to the drawings, A designates the frame of my improved stacker, which is adapted to be secured in any suitable manner to a threshing-machine.

B designates an endless carrier, which is mounted in the lower portion of the frame A and is adapted to receive the straw and chaff from the shaking member C of the threshing-machine. The shaking member C of the threshing-machine is provided at its discharge end with the frame C', which comprises the bar c, extending transversely of the shaking member C and the arms c', extending outwardly at substantially right angles from the extremities of the bar C. Secured to the bar c and the arms c' of the frame C' are a plurality of downwardly and inwardly extending rods c'', preferably formed of wire, which form, as it were, a chute, which serves to guide the straw and chaff from the shaking member C of the threshing-machine onto the carrier B of the stacker, the rods depending from the side arms c of the frame C' serving to confine the straw and chaff to the width of the elevator B. By forming the frame of this chute of separated rods the straw and chaff upon the shaking member C are permitted to fall upon the endless carrier B of the stacker, while any dirt contained therein will pass through the rods forming the chute.

D designates a second endless carrier, which is mounted in the frame A above the carrier B and is adapted to travel in the same direction. The frame carrying the carrier D is pivotally connected to the frame A at its rear end, so that the forward end of said carrier is permitted a vertical movement according to the amount of straw which happens to be upon the carrier B, the extremities of the axle carrying the forward supporting-wheels for said carrier projecting into vertically-disposed slots a in the frame A to guide said carrier in its vertical movement.

E designates the discharge-spout of the stacker, which is secured to the forward end of the frame A and is preferably formed in hinged sections, so that said sections may be folded over upon the frame of the machine during transportation.

F designates the fan-casing secured in the upper part of the frame A and in which is journaled a fan F'. The casing F is provided with the discharge-outlet $F^2$, arranged tangentially thereto and so disposed relatively to the carrier B that the air passing therethrough will engage the straw and chaff just as it leaves said carrier and force the same through the discharge-spout E.

G designates a valve which is pivotally secured at its rear end to the outer edge of the lower wall of the discharge-opening of the fan-casing and forms substantially a continuation thereof.

The fan F and the carriers B and D may be driven in any suitable manner from the threshing-machine.

Having described the construction of my improved stacker, I will now set forth the operation of the same. The straw and chaff are delivered from the shaking member C of the threshing-machine by the chute C', attached thereto, onto the carrier B, which carries the same upwardly beneath the valve G and into the path of the blast of air created by the fan F, the upward travel of said straw and chaff being facilitated by the carrier D. It will be apparent that inasmuch as the carrier D is pivotally mounted in the frame there will be no choking of straw on the carrier B, and as the lower end of the valve G always rests upon the straw on the carrier D that there is no possibility of any of the straw and chaff being blown back into the machine by any back currents of air.

What I claim, and desire to secure by Letters Patent, is—

1. In a threshing-machine, a shaking member, a stacker, an endless carrier therein, and a chute secured to the delivery end of the shaking member of the threshing-machine and adapted to deliver the material therefrom onto the carrier of the stacker.

2. In a threshing-machine, a shaking member, a stacker, an endless carrier therein, and an open-work chute secured to the delivery end of the shaking member of the threshing-machine and adapted to deliver the material therefrom onto the carrier of the stacker.

3. In a threshing-machine, a shaking member, a stacker, a carrier therein and a chute secured to the delivery end of the shaking member and adapted to deliver the material thereon onto the carrier in the stacker, the said chute being formed of a plurality of downwardly and inwardly extending separated rods.

4. In a stacker, a frame, a discharge-spout secured to the forward end of said frame, a carrier serving to convey the material into proximity to said discharge-spout, a fan-casing secured in said frame and provided with a discharge-opening adjacent the delivery end of said carrier, and a valve pivotally secured to the lower wall of the discharge-opening of said fan-casing.

5. In a pneumatic stacker, a frame, a discharge-spout secured to the forward end thereof, an endless carrier mounted in the lower portion of said frame and serving to conduct the material in the proximity of said discharge-spout, a second endless carrier pivotally supported in said frame above said first-mentioned carrier, a fan-casing mounted in said frame above said carriers and provided with a discharge-opening in advance of the forward end of the uppermost carrier, and a fan journaled in said casing.

6. In a pneumatic stacker, a discharge-spout, a carrier serving to conduct the material into proximity of said discharge-spout, a fan-casing positioned above said carrier and provided with a discharge-opening adjacent the forward end of said carrier, a valve pivotally secured to the fan-casing in rear of the discharge-opening thereof, and a fan within said casing.

FREDERICK BERNARD $\overset{\text{his}}{\times}$ CUMPSTON.
$\phantom{FREDERICK BERNARD \times}$ mark Attest:
John M. Spellman,
J. E. Thomas.